US012752862B2

(12) United States Patent
Fraley

(10) Patent No.: US 12,752,862 B2
(45) Date of Patent: Oct. 6, 2026

(54) VEHICLES INCLUDING TRUCK BED STORAGE SYSTEMS WITH ROTATING RACK ASSEMBLIES

(71) Applicant: Toyota Motor Engineering & Manufacturing North America, Inc., Plano, TX (US)

(72) Inventor: Josh D. Fraley, Saline, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 381 days.

(21) Appl. No.: 18/367,806

(22) Filed: Sep. 13, 2023

(65) Prior Publication Data

US 2025/0083753 A1 Mar. 13, 2025

(51) Int. Cl.
*B62D 33/02* (2006.01)
*B60R 9/06* (2006.01)
*B60R 11/06* (2006.01)

(52) U.S. Cl.
CPC .......... *B62D 33/0207* (2013.01); *B60R 9/065* (2013.01); *B60R 11/06* (2013.01)

(58) Field of Classification Search
CPC B60R 9/06; B60R 9/065; B60R 11/06; B60R 2011/0085; B62D 33/0207; B62D 33/0273
USPC ........................ 296/37.6, 37.8, 37.14, 146.4; 224/402–404, 282, 553; D12/406, 414.4, D12/423, 424
See application file for complete search history.

(56) References Cited

U.S. PATENT DOCUMENTS

| | | | | | |
|---|---|---|---|---|---|
| 4,085,961 | A | * | 4/1978 | Brown | B65D 25/24<br>217/60 B |
| 4,564,167 | A | * | 1/1986 | Smith | F16M 11/08<br>248/552 |
| 4,598,049 | A | * | 7/1986 | Zelinka | C07H 21/00<br>422/111 |
| 4,789,195 | A | * | 12/1988 | Fletcher | B60R 11/06<br>224/543 |
| D305,315 | S | * | 1/1990 | Fletcher | D3/905 |
| 4,971,234 | A | * | 11/1990 | Hay | B25H 5/00<br>414/532 |
| 5,088,636 | A | | 2/1992 | Barajas | |
| 5,398,987 | A | * | 3/1995 | Sturgis | B60R 9/00<br>224/404 |
| 5,498,048 | A | * | 3/1996 | Shelby, Jr. | B60P 3/14<br>296/24.45 |
| D373,988 | S | * | 9/1996 | Johnson | D12/423 |
| D411,164 | S | * | 6/1999 | Harris | D12/414.1 |

(Continued)

*Primary Examiner* — Gregory A Blankenship
(74) *Attorney, Agent, or Firm* — Dinsmore & Shohl LLP

(57) ABSTRACT

A vehicle includes a truck bed that includes a bed deck and a storage system that includes a rack assembly including a housing having a fixed size that occupies at least 10 percent of a total area of the bed deck in a stowed position. The rack assembly includes a pivot mechanism that is mounted to a rear pillar of the vehicle and provides a fixed pivot location. The rack assembly is configured to pivot about the pivot location from the stowed position entirely within the truck bed overhanging the bed deck to an extended position at least partially out of the truck bed and overhanging a tailgate of the truck bed.

18 Claims, 5 Drawing Sheets

(56) References Cited

U.S. PATENT DOCUMENTS

| | | | | | |
|---|---|---|---|---|---|
| 6,003,923 | A * | 12/1999 | Scott | B60R 11/06 | 296/37.6 |
| 6,499,795 | B2 | 12/2002 | Clare | | |
| 6,502,885 | B1 * | 1/2003 | Gammon | B60R 7/02 | 224/511 |
| 6,641,236 | B2 * | 11/2003 | Grudzien | A47B 88/944 | 312/216 |
| 6,698,634 | B2 * | 3/2004 | Thomson | E04H 15/06 | 224/404 |
| 7,309,093 | B2 * | 12/2007 | Ward | B60P 3/14 | 206/349 |
| 7,794,003 | B2 * | 9/2010 | Crandall | B60R 9/00 | 224/403 |
| 8,925,777 | B1 | 1/2015 | Casucci et al. | | |
| 9,738,232 | B1 * | 8/2017 | Hill | B60R 7/02 | |
| 10,596,975 | B1 * | 3/2020 | Quintus | F16C 11/103 | |
| 10,800,341 | B2 * | 10/2020 | Merryman | B60R 9/065 | |
| D1,032,481 | S * | 6/2024 | Draffkorn | D12/423 | |
| 2003/0189353 | A1 * | 10/2003 | Moore | B60R 11/06 | 296/37.6 |
| 2006/0284437 | A1 * | 12/2006 | Collins | B60P 1/003 | 296/37.6 |
| 2007/0152003 | A1 * | 7/2007 | Dollar, Jr. | B60R 11/00 | 224/404 |
| 2009/0200351 | A1 * | 8/2009 | Brallier | B60R 9/00 | 224/404 |
| 2014/0054339 | A1 * | 2/2014 | Smith | B60P 3/14 | 224/404 |
| 2015/0086312 | A1 | 3/2015 | Ohnesorge | | |
| 2016/0023586 | A1 * | 1/2016 | Potticary | B60R 11/00 | 414/462 |
| 2022/0388578 | A1 * | 12/2022 | Gill | B62D 33/0273 | |
| 2025/0083753 | A1 * | 3/2025 | Fraley | B62D 33/0207 | |
| 2025/0289374 | A1 * | 9/2025 | Kidd | B60R 9/065 | |

* cited by examiner

VEHICLES INCLUDING TRUCK BED STORAGE SYSTEMS WITH ROTATING RACK ASSEMBLIES

TECHNICAL FIELD

The present specification generally relates to storage systems for truck beds and, more specifically, to truck bed storage systems with rotating rack assemblies.

BACKGROUND

Pickup trucks often have truck beds that are used to carry cargo from one place to another. During movement of the trucks, the cargo can move around in the truck beds if left unrestrained, which can cause noise and may also damage the cargo and/or truck bed. Further, the cargo may move to the front of the truck bed which can reduce accessibility to the cargo when the cargo is removed from the truck beds. In some instances, it may even be necessary to climb into the truck beds to access the cargo and remove the cargo from the truck beds. Accordingly, what is needed are storage systems that can be used to store cargo while in the truck beds.

SUMMARY

In accordance with one embodiment, a vehicle includes a truck bed that includes a bed deck and a storage system that includes a rack assembly including a housing. The rack assembly includes a pivot mechanism that is mounted to a rear pillar of the vehicle and provides a fixed pivot location. The rack assembly is configured to pivot about the pivot location from a stowed position entirely within the truck bed overhanging the bed deck to an extended position at least partially out of the truck bed and overhanging a tailgate of the truck bed.

In accordance with another embodiment, a storage system includes a rack assembly that includes a housing. The rack assembly includes a pivot mechanism that is configured to mount to a rear pillar of the vehicle and provide a fixed pivot location. The rack assembly is configured to pivot about the pivot location from a stowed position entirely within a truck bed overhanging the bed deck to an extended position at least partially out of the truck bed and overhanging a tailgate of the truck bed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification are vehicles that include a passenger cabin and a truck bed located rearward of the passenger cabin. The truck bed includes a bed deck and a storage system that includes a rack assembly that has a fixed size that occupies at least 30 percent of a total area of the bed deck. The rack assembly includes a pivot mechanism that is mounted to a rear pillar of the vehicle and provides a fixed pivot location. The rack assembly is configured to pivot about the pivot location from a stowed position entirely within the truck bed overhanging the bed deck to an extended position at least partially out of the truck bed and overhanging a tailgate of the truck bed.

Figure 1:
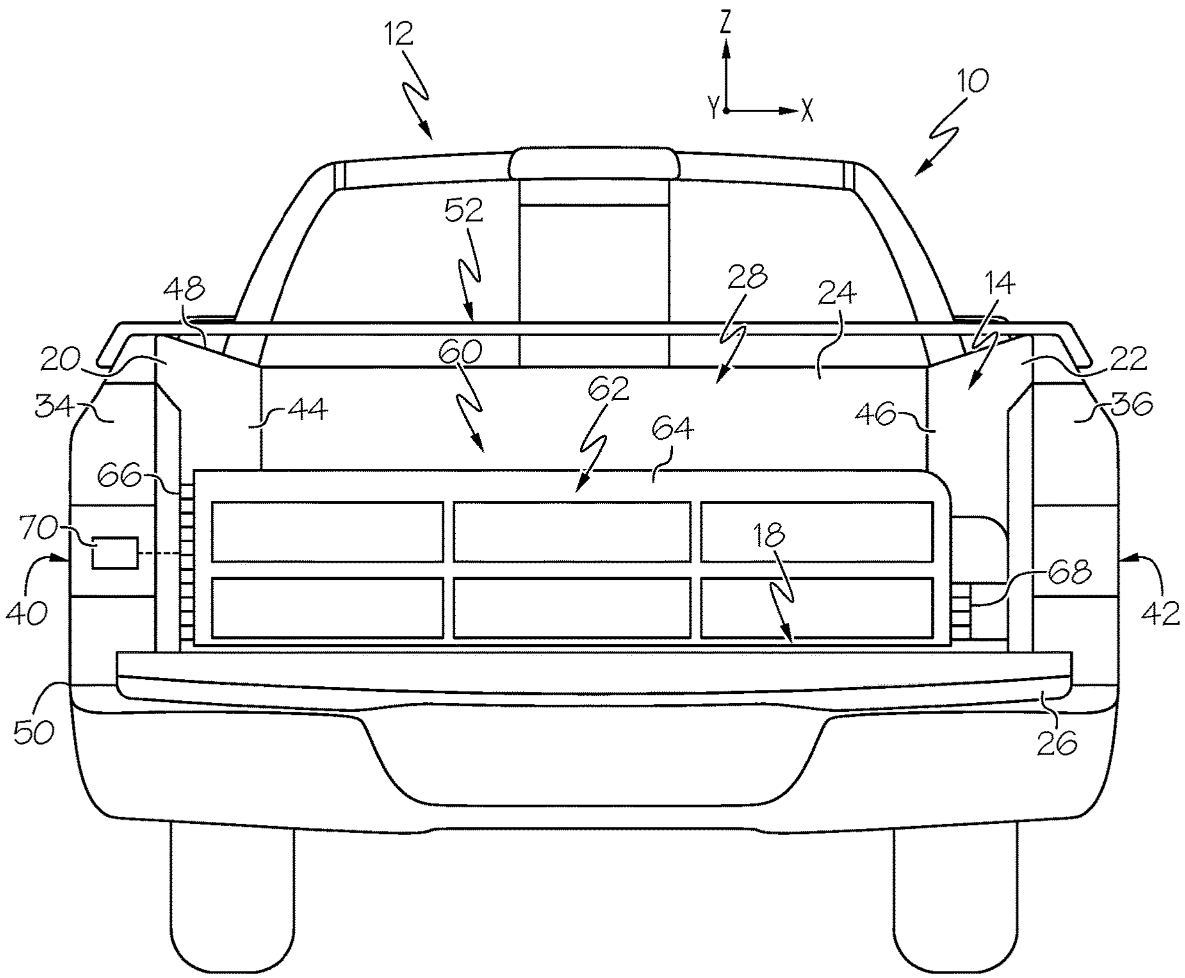
FIG. 1 schematically depicts a rear view of a pickup truck having a truck bed with storage system, according to one or more embodiments shown and described herein.

As used herein, the term “vehicle longitudinal direction” refers to the forward-rearward direction of the pickup truck (i.e., in the vehicle Y direction depicted in FIG. 1). The term “vehicle lateral direction” refers to the cross-pickup truck direction (i.e., in the vehicle X direction depicted in FIG. 1), and is transverse to the vehicle longitudinal direction. The term “vehicle vertical direction” refers to the upward-downward direction of the pickup truck (i.e., in the vehicle Z-direction depicted in FIG. 1). As used herein, “upper,” “over” and “above” are defined as the positive Z direction of the coordinate axis shown in the drawings. “Lower,” “under,” and “below” are defined as the negative Z direction of the coordinate axis shown in the drawings.

Referring to FIG. 1, the terms “outboard” or “outward” as used herein refers to the relative location of a component in a direction with respect to a pickup truck centerline. The term “inboard” or “inward” as used herein refers to the relative location of a component in a direction with respect to the pickup truck centerline. Because the pickup truck structures may be generally symmetrical about the pickup truck centerline, the direction to which use of terms “inboard,” “inward,” “outboard” and “outward” refer may be mirrored about the pickup truck centerline when evaluating components positioned along opposite sides of the pickup truck 10.

The pickup truck 10 includes a passenger cabin 12 and a truck bed 14. The truck bed 14 includes a bed deck 18 (i.e., a floor), a pair of spaced apart sidewalls 20, 22, a front wall 24, and a rear wall 26. The floor 18, the sidewalls 20, 22, the front wall 24, and the rear wall 26 define a storage area 28 of the truck bed 14.

The sidewalls 20, 22 extend parallel to the vehicle longitudinal direction. Each sidewall 20, 22 includes a front end 30, 32 and an opposite rear end 34, 36 that forms a rear pillar of the truck bed 14. The front wall 24 extends between the front ends 30, 32 of the sidewalls 20, 22. The rear wall 26 extends between the rear ends 34, 36 of the sidewalls 20, 22.

In some embodiments, it is appreciated, that the rear wall 26 is pivotally connected to the sidewalls 20, 22 as a tailgate for movement between a closed position and an open position. In the closed position, the rear wall 26 extends parallel to the vehicle vertical direction. In the open position, the rear wall 26 extends parallel to the vehicle longitudinal direction.

The sidewalls 20, 22 include an exterior wall panel 40, 42 and an opposite interior wall panel 44, 46. The sidewalls 20, 22 include upper ends 48 and opposite lower ends 50. The lower ends 50 are positioned closer to the bed deck 18 of the truck bed 14 than the upper ends 48. The sidewalls 20 and 22 may include a sidewall cover that is used to cover the upper ends 48.

A truck bed cover 52 is releasably connected to the sidewalls 20 and 22 and extends over the truck bed 14. The truck bed cover 52 includes at least one panel that may be hingedly or otherwise attached to the front wall 24 to allow for moving the truck bed cover 52 between open and closed configurations. In the example of FIG. 1, the truck bed cover 52 is in the closed configuration.

Figure 2:
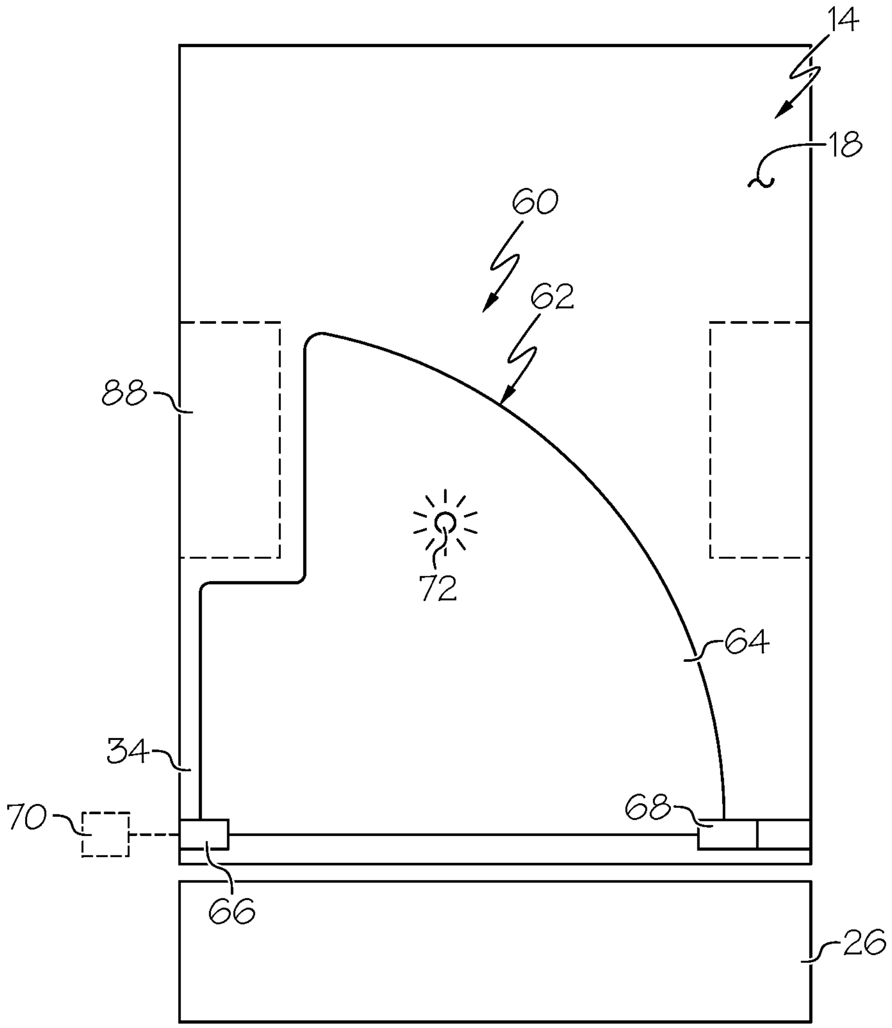
FIG. 2 schematically depicts a top view of the truck bed with the storage system of FIG. 1 in a stowed position, according to one or more embodiments shown and described herein.

Referring to FIGS. 1 and 2, the pickup truck 10 includes a storage system 60. The storage system 60 includes a rack assembly 62 including a housing 64 having a fixed size that is large compared to conventional storage systems and may occupy an area (i.e., a footprint area in a stowed position) of at least 10 percent or more of a total area of the bed deck 18, such as 20 percent or more, such as 30 percent or more, such as 40 percent or more, such as 50 percent or more, such as 60 percent or more of the bed deck 18 in a stowed position as shown in FIGS. 1 and 2. The rack assembly 62 includes a pivot mechanism 66 (e.g., a hinge) that may be mounted to the rear pillar 34 or 36 of the vehicle 10 and provides a fixed pivot location about which the housing 64 can pivot. The rack assembly 62 is configured to pivot about the pivot location from the stowed position entirely within the truck bed 14 overhanging the bed deck 18 to an extended position (FIG. 3) at least partially out of the truck bed 18 and overhanging the tailgate 26 of the truck bed 14. The rack assembly 62 may further include a locking system 68, such as a latch, ratchet, locking roller, gear, etc., that can be used to lock the housing 64 at a desired rotational position relative to the pivot location. The housing 64 may be provided with a light 72 that provide lighting when needed, such as at nighttime.

In some embodiments, the pivot mechanism 66 may include a cam mechanism that can be used to lock an angular position of the housing 64. In some embodiments, the rotation of the housing 64 may be motorized by a motor 70 that can be operatively linked to the pivot mechanism 66. Control of the motor 70 can be managed using a user input, such as controls within the vehicle 10, a key fob, mobile computing device, etc.

Figure 3:
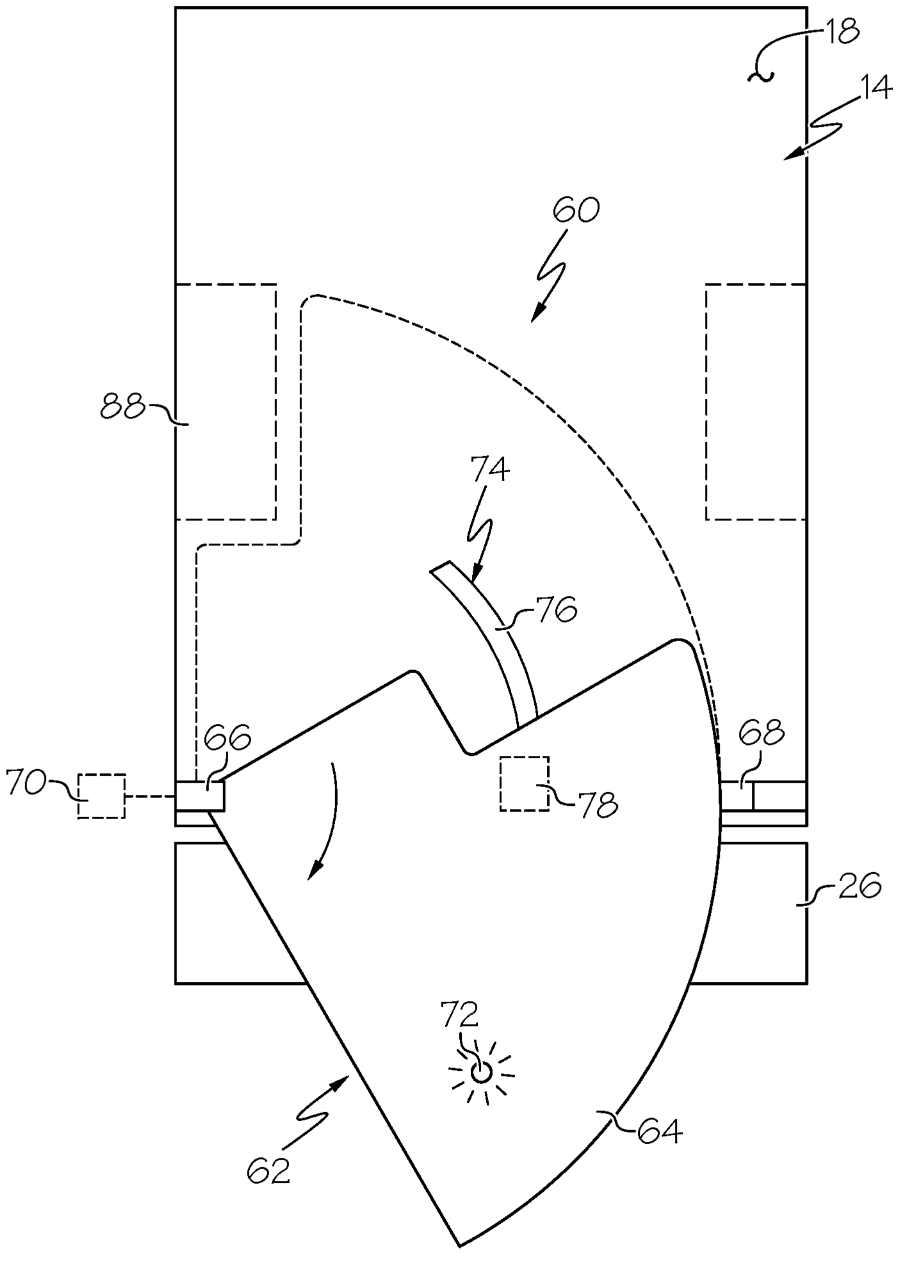
FIG. 3 schematically depicts the storage system of FIG. 2 in an extended position, according to one or more embodiments shown and described herein.

Referring to FIG. 3 showing the rack assembly 62 in the extended position, because the housing 64 is large, a track system 74 may be provided beneath the housing 64 to provide vertical support, particularly in the open position. The track assembly 62 may include an arcuate track 76 along which a roller 78 or other track following element may travel as the housing 64 moves toward the extended position.

Figure 4:
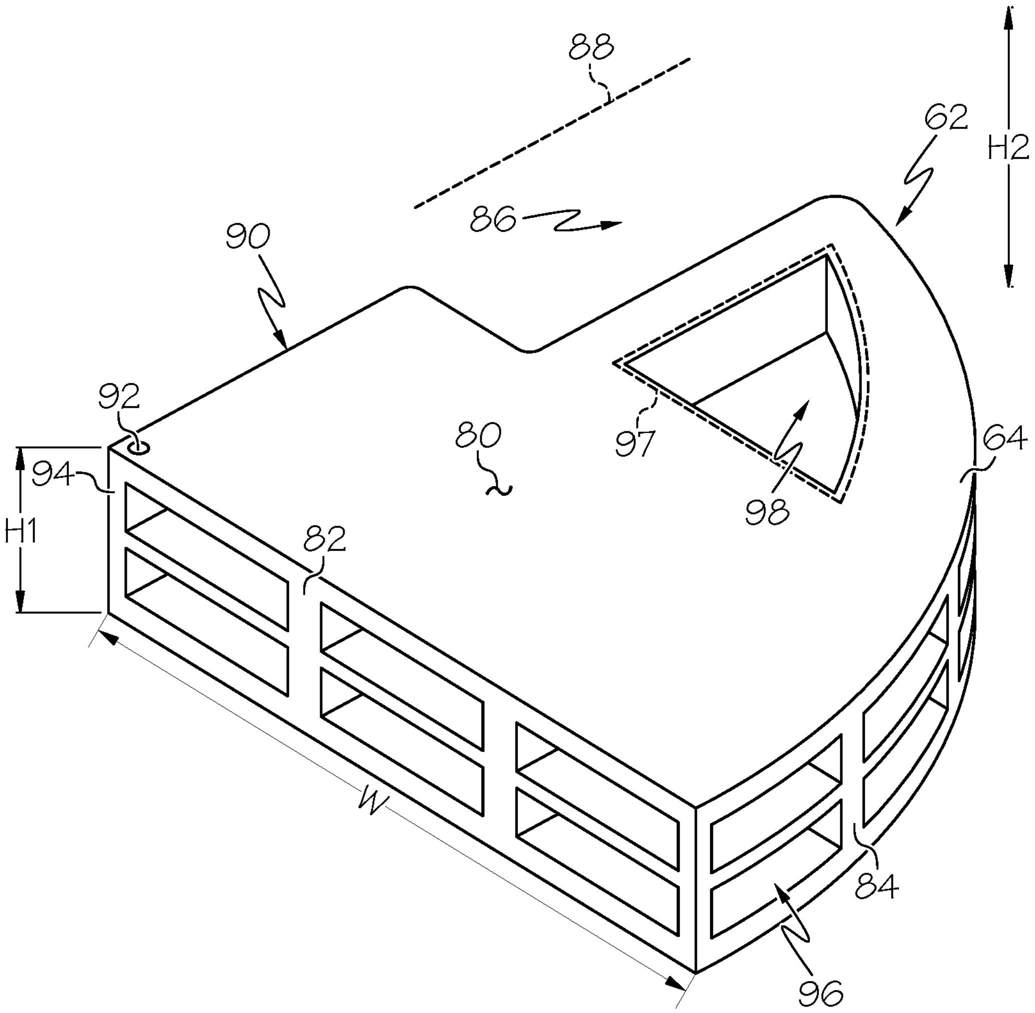
FIG. 4 schematically depicts a housing of a rack assembly of the storage system of FIG. 1, according to one or more embodiments shown and described herein.

Referring now to FIG. 4 details of the rack assembly 62 and housing 64 are illustrated. The rack assembly 62 includes the housing 64 that is relatively short in height H relative to the width W providing a tray-like appearance that provides a top surface 80 that can extend parallel to the bed deck 18 having a surface area at least 30 percent or more of a total area of the bed deck 18, such as 40 percent or more, such as 50 percent or more, such as 60 percent or more of the bed deck 18. In some embodiments, the height $H_1$ of the housing 64 may be shorter than a height $H_2$ of wheel well 88. In other embodiments, $H_1$ may be greater than or equal to $H_2$. The top surface 80 can be sized to be used as a working surface with the rack assembly 62 in the stowed and extended positions.

The housing 64 may further include a first sidewall 82 that extends downward from the top surface 80 and extends generally in the vehicle lateral direction with the rack assembly 62 in the stowed position and a second sidewall 84 that extends downward from the top surface 80 and is arcuate, extending both in the vehicle longitudinal and lateral directions from the first sidewall 82 to a wheel well cutout portion 86 that nests alongside the wheel well 88 (FIGS. 1-3) of the vehicle 10. In embodiments where $H_1$ is greater than $H_2$, the cutout portion 86 may be formed in a bottom portion of the housing 64 and the housing 64 may extend over the wheel well 88. As can be seen in FIG. 2, in the stowed position, the housing 64 may extend from a position near the tailgate 26 alongside the wheel well 88 in the vehicle longitudinal direction. The wheel well cutout portion 86 is formed as a recess that is formed in a third sidewall 90 of the housing 64. The pivot location 92 may be located in a corner 94 where the first sidewall 82 and the third sidewall 90 meet.

The housing 64 may include trays, shelves and/or bins 96 that, in the illustrated example, are provided along the first and second sidewalls 82 and 84. The housing 64 may also include one or more trays or bins 98 at the top surface 80 for holding items. In some embodiments, the trays, shelves and/or bins 96 and 98 may have a lid, represented by dashed lines 97. The lid 97 can be used to cover the trays, shelves and/or bins 96 and 98 and keep out water and debris. The lid 97 can be smaller or larger than the trays, shelves and/or bins 96 and 98. In some embodiments the trays, shelves and/or bins 96 and 98 may be large enough to cover the top surface 80. The lid 97 can be fitted to each to each individual trays, shelves and/or bins 96 and 98, or the lid 97 can be attached via hinges, tabs and/or latches.

Referring also to FIGS. 1 and 2, as may be appreciated, when the bins 96 along the first and second sidewalls 82 and 84 have cargo, it may be more difficult to access the bins 96 along the second sidewall 84 compared to the first sidewall with the rack assembly 62 in the stowed position. Referring to FIGS. 3 and 4, rotating the housing 64 to the extended position can provide increased access to the bins 96 along the second sidewall 84. Additionally, rotating the housing 64 to the extended position can also move the bins 96 farther rearward compared to the stowed position, which can provide increased accessibility to items within the bins 96.

Figure 5:
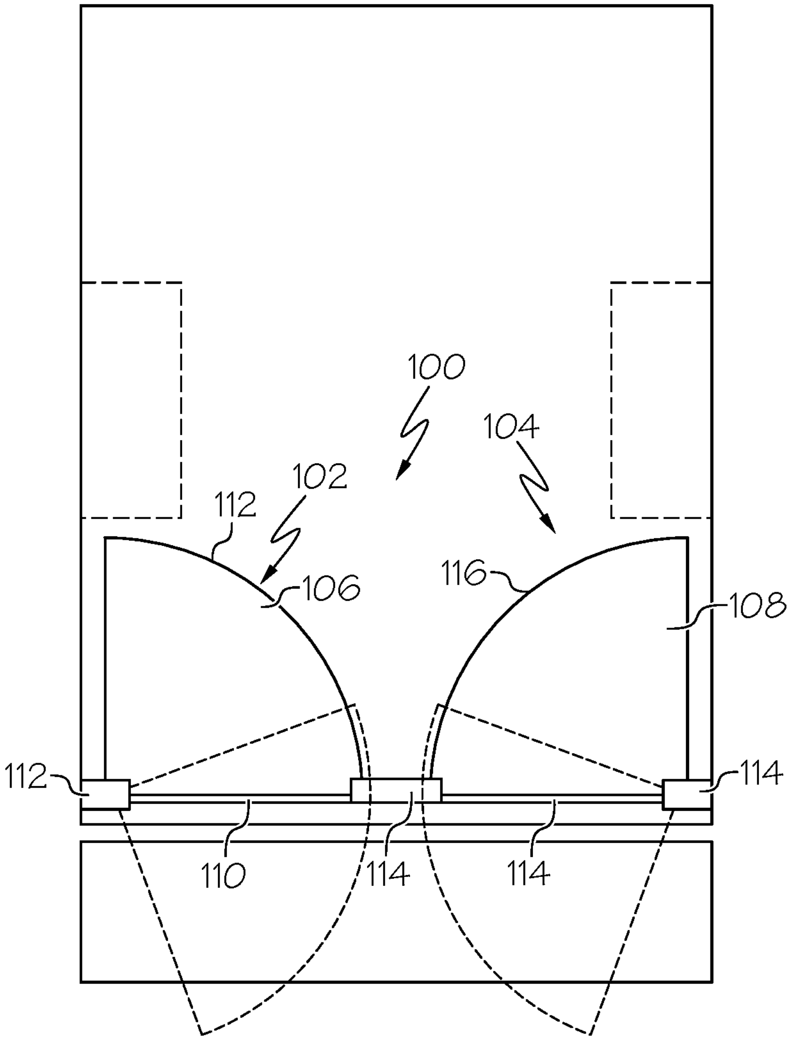
FIG. 5 schematically depicts a top view of another storage system with multiple rack assemblies, according to one or more embodiments shown and described herein.

FIG. 5 illustrates another embodiment of a storage system 100 that includes multiple rack assemblies 102 and 104. Each rack assembly 102 and 104 includes a housing 106, 108 that include bins that extend along one or both of the first and second sidewalls 110, 112 and 114, 116 in a fashion similar to that of housing 62 above. The housings 106 pivot about pivot locations 112, 114 between a stowed position and an extended position shown by dashed lines. A locking system 114 may be provided to lock angular positions of one or both of the housings 106, 108.

The above-described storage systems include rack assemblies that are relatively large, which can provide increased working and overall usage area for the rack assemblies. The rack assemblies may be rotated manually or using a motor that can be used to rotate the rack assemblies based on a user input. The rack assemblies can occupy a large area of the bed deck compared to conventional storage systems without extending over any wheel well.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:

a truck bed comprising a bed deck; and a storage system comprising a rack assembly comprising a housing, the rack assembly comprising a pivot mechanism that is mounted to a rear pillar of the vehicle and provides a fixed pivot location, wherein the rack assembly is configured to pivot about the pivot location from a stowed position entirely within the truck bed overhanging the bed deck to an extended position at least partially out of the truck bed and overhanging a tailgate of the truck bed;

wherein the housing is sized and configured to extend between wheel wells of the truck bed and alongside one of the wheel wells nearest the rear pillar in the stowed position, the rack assembly configured to pivot between the wheel wells away from the wheel well nearest the rear pillar to the extended position;

wherein the housing comprises a first sidewall that extends in a vehicle lateral direction and a second sidewall that extends inn a vehicle longitudinal direction with the rack assembly in the stowed position, a first end of the first sidewall and a first end of the second sidewall are joined together adjacent the rear pillar, a second end of the first sidewall and a second end of the second sidewall are connected by an arcuate wall, when viewed in plan view.

2. The vehicle of claim 1, wherein the housing comprises a top wall that extends parallel to the bed deck, the first sidewall extends downward from the top wall and in a vehicle lateral direction with the rack assembly in the stowed position, the second sidewall extends downward from the top wall and outward from the first sidewall.

3. The vehicle of claim 2, wherein the housing comprises one or more bins accessible along the first sidewall.

4. The vehicle of claim 3, wherein the housing comprises one or more other bins accessible along the second sidewall.

5. The vehicle of claim 2, wherein the housing comprises the arcuate wall that extends downward from the top wall and between the first and second sidewalls.

6. The vehicle of claim 5, wherein the second sidewall having a wheel well recess that is sized to receive the wheel well nearest the rear pillar with the rack assembly in the stowed position.

7. The vehicle of claim 6, wherein a first height of the housing is equal to or less than a second height of the wheel well.

8. The vehicle of claim 1 further comprising a motor operatively connected to the housing that pivots the housing about the pivot location.

9. The vehicle of claim 1, wherein the storage system comprises a track system configured to support the housing in the extended position.

10. The vehicle of claim 1 wherein the storage system comprises a locking mechanism configured to lock the housing at an angular location relative to the pivot location.

11. The vehicle of claim 1, wherein the housing occupies at least about 30 percent of the total area of the bed deck in the stowed position.

12. A storage system comprising:

a rack assembly comprising a housing, the rack assembly comprising a pivot mechanism that is configured to mount to a rear pillar of the vehicle and provide a fixed pivot location, wherein the rack assembly is configured to pivot about the pivot location from a stowed position entirely within a truck bed overhanging the bed deck to an extended position at least partially out of the truck bed and overhanging a tailgate of the truck bed;

wherein the housing is sized and configured to extend between wheel wells of the truck bed and alongside one of the wheel wells nearest the rear pillar in the stowed position, the rack assembly configured to pivot between the wheel wells away from the wheel well nearest the rear pillar to the extended position;

wherein the housing comprises a first sidewall that extends in a vehicle lateral direction and a second sidewall that extends inn a vehicle longitudinal direction with the rack assembly in the stowed position, a first end of the first sidewall and a first end of the second sidewall are joined together adjacent the rear pillar, a second end of the first sidewall and a second end of the second sidewall are connected by an arcuate wall, when viewed in plan view.

13. The storage system of claim 12, wherein the housing comprises a top wall configured to extend parallel to the bed deck, the first sidewall that extends downward from the top wall and in a vehicle lateral direction with the rack assembly in the stowed position, a second sidewall that extends downward from the top wall and outward from the first sidewall.

14. The storage system of claim 13, wherein the housing comprises one or more bins accessible along the first sidewall.

15. The storage system of claim 14, wherein the housing comprises one or more other bins accessible along the second sidewall.

16. The storage system of claim 14, wherein the housing comprises the arcuate wall that extends downward from the top wall and between the first and second sidewalls.

17. The storage system of claim 16, wherein the second sidewall has a wheel well recess that is sized to receive a wheel well of the truck bed with the rack assembly in the stowed position.

18. The storage system of claim 17, wherein a first height of the housing is equal to or less than a second height of the wheel well.

* * * * *